May 25, 1937. C. D. MARSHALL 2,081,361
CORN CUTTER
Filed Oct. 15, 1935

Charles D. Marshall
INVENTOR.
BY W. B. Hanyman
ATTORNEY.

Patented May 25, 1937

2,081,361

UNITED STATES PATENT OFFICE 2,081,361

CORN CUTTER

Charles D. Marshall, North Jackson, Ohio

Application October 15, 1935, Serial No. 45,011

2 Claims. (Cl. 146—4)

This invention relates to hand corn cutters.

The principal object of this invention is to provide a hand corn cutter having an adjustable cutting blade.

A further object of this invention is to provide a hand corn cutter which cuts a number of rows of kernels at a single stroke.

A still further object of this invention is to provide a hand corn cutter having an indicator showing the depth of cut to be made.

In canning corn it is necessary to cut the kernels from the cob. In order to do this, the present method is to use a straight knife which cuts off about two rows of the kernels entirely and cuts parts of two or three other rows, due to the curved surface of the ear of corn. This method is not desirable as it causes a large number of the kernels to be cut in small pieces which are not attractive. With my invention it is possible to cut a number of rows with one stroke and the kernels will all be of even depth.

Another advantage of my invention is in providing an adjustable cutting blade. Thus it is possible to cut to any desirable depth of the kernel and to cut corn from ears of various size.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1:
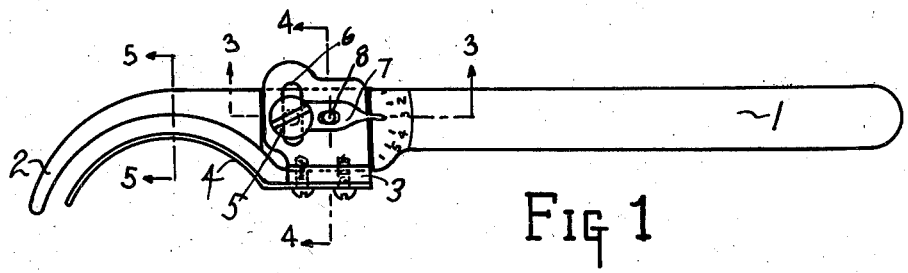
Figure 1 is a top plan view of the corn cutter, showing the means for adjusting the cutting blade.

By referring to the drawing it will be seen that the corn cutter is provided with a handle 1, a curved guide member 2, and a slidably maintained support member 3 upon which is mounted a cutting blade 4. This cutting blade 4 is adjustable by means of a screw 5 functioning within a slot 6 in the slidably maintained support member 3.

It will also be seen that there is an indicator hand 7 pivoted to the slidably maintained support member 3 by means of a pivot 8. One end of this indicator hand 7 is attached to the screw 5 while the other end of this indicator hand 7 extends over a portion of the handle 1 which is marked with any desirable scale to show the depth of kernel cut.

It will be seen that in use, this corn cutter may be adjusted to cut kernels from any size ear of corn as well as to cut to any desired depth of the kernel.

Figure 2:
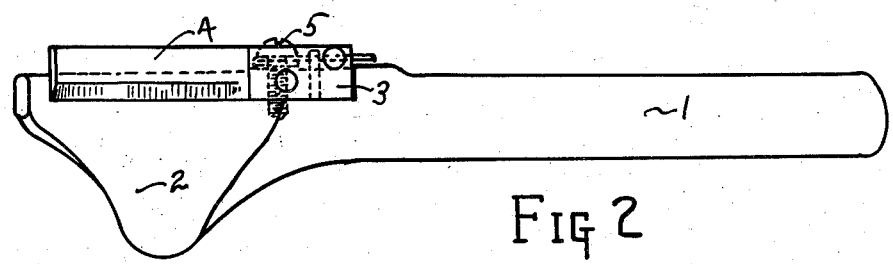
Figure 2 is a side elevation of the corn cutter.
Figure 4:
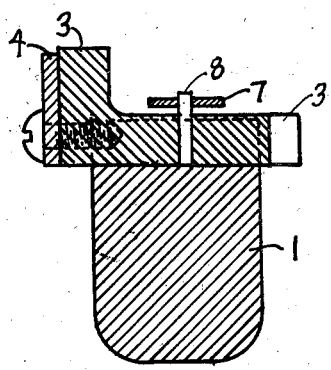
Figure 4 is a cross section taken on line 4—4 of Figure 1.
Figure 3:
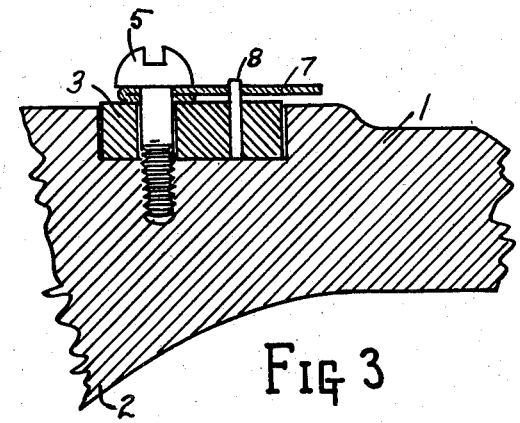
Figure 3 is a cross section taken on line 3—3 of Figure 1.
Figure 5:
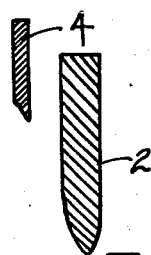
Figure 5 is a cross section taken on line 5—5 of Figure 1.

By referring to Figure 2 it will be seen that the lower portion of the curved guide member 2 forms a channel for the cut kernels and juices.

What I claim is:—

1. In a hand corn cutter, a handle for said hand corn cutter, a guide member fixed to the handle, a cutting blade for said corn cutter mounted on the handle in longitudinal spaced relation to said guide, means for adjusting the space between the guide and cutting blade, said means comprising a slidably maintained support member positioned on said handle and carrying said cutting blade and a screw in said handle functioning within a slot in said slidably maintained support member, an indicator hand having one end thereof pivoted to said screw and pivotally engaged at its midportion with the said slidable support member.

2. In a hand corn cutter, a handle for said hand corn cutter, a curved guide member fixed to the handle, a cutter blade adjustably mounted on the handle in longitudinal spaced relation to said guide, said adjustable cutting blade comprising a slidably maintained support member carrying said cutting blade and a screw on said handle functioning within a slot in said slidably maintained support member, an indicator hand positioned by said screw and pivoted in said support member, and a scale on said handle for showing the position of said cutting blade.

CHARLES D. MARSHALL.